United States Patent [19]

Fisher et al.

[11] 4,106,156

[45] Aug. 15, 1978

[54] SEGMENTED GUIDE EYE

[76] Inventors: Sidney L. Fisher, 3115 Mt. View Dr.; Harry S. Fisher, 14233 183rd Ave. SE., both of Renton, Wash. 98055

[21] Appl. No.: 826,306

[22] Filed: Aug. 22, 1977

Related U.S. Application Data

[63] Continuation of Ser. No. 747,394, Dec. 3, 1976, abandoned.

[51] Int. Cl.[2] .......... F16L 11/10

[52] U.S. Cl. .......... 16/2; 16/108; 254/190 D

[58] Field of Search .......... 16/2, 108, 109; 254/190 R, 190 D; 308/237 R, 238, 239; 242/157 R; 182/142, 145

[56] References Cited

U.S. PATENT DOCUMENTS

| | | | |
|---|---|---|---|
| 1,636,528 | 7/1927 | Morris | 308/237 R |
| 2,238,398 | 4/1941 | Reed | 254/190 D |
| 2,307,874 | 1/1943 | Bilde | 308/238 |
| 2,464,664 | 3/1949 | Amon | 254/190 D |
| 2,529,486 | 11/1950 | Clarkson et al. | 242/157 R X |
| 2,816,950 | 12/1957 | Kruss et al. | 16/2 X |
| 3,563,621 | 2/1971 | Gruss | 308/238 |

FOREIGN PATENT DOCUMENTS

| | | | |
|---|---|---|---|
| 153,354 | 5/1938 | Austria | 308/237 R |
| 724,308 | 11/1966 | Italy | 16/2 |

*Primary Examiner*—Dorsey Newton
*Attorney, Agent, or Firm*—Graybeal, Barnard & Uhlir

[57] ABSTRACT

A plurality of ring members each having a hard metal inner ring portion, a concentric elastomeric outer ring portion and a layer of elastomeric material bounding at least one radial face, are held by a cylindrical member in a stacked relation with the open centers of the ring members aligned. A pair of end plates, each having a wire rope aperature aligned with the open centers of the ring members, are secured together by a plurality of fasteners thereby retaining the cylindrical member between them. When a tensioned wire rope or the like passing through the open centers of the ring members bears sideways against the hard metal inner ring portions, the elastomeric outer ring portions distort to allow a bending line of contact between the wire rope and the hard metal inner ring portions.

8 Claims, 4 Drawing Figures

SEGMENTED GUIDE EYE

This is a continuation, of application Ser. No. 747,394, filed Dec. 3, 1976, now abandoned.

BACKGROUND OF THE INVENTION

1. Field of the Invention

This invention relates to a guide eye for a wire rope or the like, and more particularly to a segmented guide eye, having a stacked arrangement of rings each having a hard metal inner ring portion and a concentric elastomeric outer ring portion. The guide eye of this invention was developed as an improvement on the guide eye arrangement disclosed by U.S. Pat. No. 2,998,094, granted Aug. 29, 1961, to Sidney L. Fisher. Such patent is owned by the assignee of this application.

2. Description of the Prior Art

Guide eyes for wire rope are well known and generally comprise an eye through which the wire rope passes. One common form has a flaired passageway through which a wire rope passes that provides a hard preformed curved surface in contact with the wire rope. Because the fleet angle of the wire rope may vary, the hard preformed curved surface cannot provide an optimum amount of contact area for the wire rope at all times, resulting in rapid wear of both the wire rope and guide eye as the wire rope moves back and forth through the guide eye. Examples of this type of guide eye in the patent literature are U.S. Pat. No. 2,367,836, granted Jan. 23, 1945 to R. W. Brown; U.S. Pat. No. 3,215,405, granted Nov. 2, 1965 to R. E. Walsh; and U.S. Pat. No. 3,506,999 granted Apr. 21, 1970 to C. W. Neher. Another common form of single eye guide eye has the wire rope passing through a central passageway which is composed of a resilient material such as rubber and is bendable in response to a sidewise load applied to it by the wire rope. This form of guide eye has the disadvantage that the resilient material rapidly wears away and must be replaced or damage to the wire rope and guide eye will result as the wire rope moves back and forth through the guide eye. Examples in the patent literature are U.S. Pat. No. 2,529,486, granted Nov. 14, 1950 to W. S. Clarkson et al.; U.S. Pat. No. 2,631,819, granted Mar. 17, 1953 to R. C. Duncan; and U.S. Pat. No. 2,695,770, granted Nov. 30, 1954 to A. L. Stone.

Another type of guide eye has the wire rope riding in the peripheral groove of one or more pulleys. Frequently there is slippage between the wire rope and the pulleys which results in wear to the wire rope and pulley. Further, such a form of guide eye will generally permit motion of the wire rope only in one plane, making it of little use where the wire rope must move in many planes.

SUMMARY OF THE INVENTION

In basic form, the segmented guide eye for a tensioned wire rope or the like of the present invention comprises a plurality of ring members each comprising a hard metal inner ring portion and a concentric elastomeric outer ring portion, held in a stacked relation with the open centers of the inner ring portions aligned.

In use, the wire rope frequently bends as it passes through the segmented guide eye of the present invention, and exerts a sidewise load against the hard metal inner ring portions. As each hard metal inner ring portion is loaded, its concentric elastomeric outer ring portion deforms, thereby permitting each hard metal inner ring portion to flex in the guide eye and assume a position wherein its inner surface makes full contact with the bent wire rope. Since each hard metal inner ring portion is designed to do this, the result is a bending line of contact between the wire rope, and the hard metal inner ring portions. This results in a desirable large area of contact regardless of the amount of bending the wire rope experiences as it passes through the guide eye.

According to another aspect of the invention, the ring members are snugly held by a concentric cylindrical member which is retained between a pair of end plates, each of which has a wire rope aperature co-axial with the open centers of the ring members. A plurality of fasteners extending between the end plates hold in a securely assembled relation the end plates, the cylinder and a looped portion of a frame member which may extend about a portion of the cylinder and be sandwiched between the end plates.

In a further aspect of the present invention, for reasons described more fully subsequently, the diameter of the wire rope aperature in one end member is sized between the inner and outer diameters of the hard metal inner ring portion of the adjacent ring member; while the diameter of the wire rope aperature in the other end member is sized between the inner and outer diameters of the elastomeric outer ring portion of the adjacent ring member.

According to another aspect of the present invention, elastomeric material bounds at least one radial face of each hard metal inner ring portion, to form a shock cushion for the segmented guide eye of the present invention.

In a further aspect of the present invention each ring member may also have a bonded connection between the hard metal inner ring portion and both the elastomeric outer ring portion and the shock cushion.

It is a primary object of the present invention to provide a durable, segmented guide eye for a wire rope or the like which reduces cable and guide eye wear by providing a bending line of contact between the cable and the hard metal, highly polished, inner ring portions of the guide eye.

These and further objects, features, advantages and characteristics of the segmented guide eye of the present invention will be apparent from the following more detailed description of the preferred embodiments.

DESCRIPTION OF THE PREFERRED EMBODIMENTS

It must be understood that the segmented guide eye of the present invention is useful in any installation where a wire rope, cable, or the like passes through an opening in a structure and may bear against the walls of the opening. In such a situation, relative movement between the wire rope and the walls of the opening results in rapid wear of the wire rope, soon causing fraying or even breakage of the wire rope, thereby necessitating its replacement, often at great cost. Of course, if the wire rope frays and breaks, whatever is carried by the wire rope may fall with obvious attendant risks of destruction to both life and property. If the wire rope is used to secure one object to another, such as is the case when mooring a boat or ship to a dock, such breakage of the cable may result in the vessel drifting away.

Further, in some installations, the wearing of the wire rope against the wall of the opening through which it passes may elongate the opening or even completely wear through the structure, causing the need for costly repairs to the structure itself.

Figure 1:
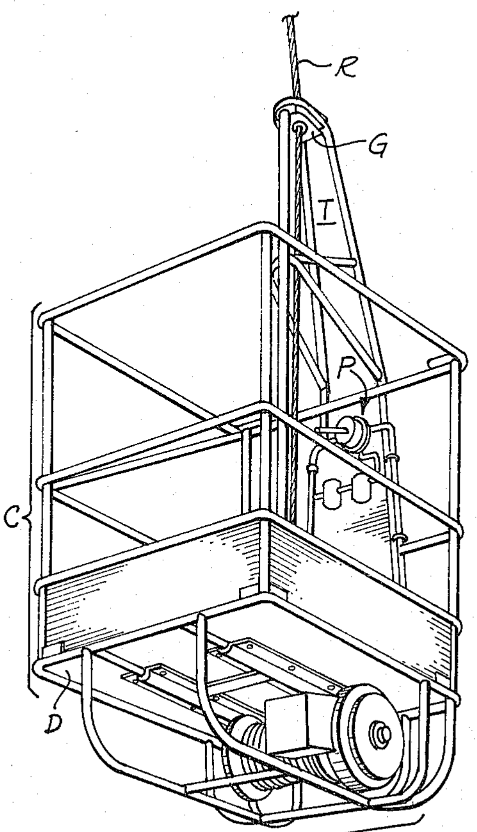
FIG. 1 is a pictorial view from a lower aspect of a single suspension power driven staging, incorporating the segmented guide eye of the present invention.

U.S. Pat. No. 2,998,094, granted Aug. 29, 1961 to S. L. Fisher, shows a staging equipment typically incorporating an embodiment of the present invention, as is illustrated in FIG. 1. The staging shown comprises an operator's cage C having a deck D and mounting a fixed mast or tripod T having at the top thereof the segmented guide eye G of the present invention through which is led the wire rope R on which the staging is suspended. Winch unit W is mounted at the bottom of the cage C and is operator controlled, and is designed to be suspended along the side of a building, antenna structure, stack or the like, the operator selectively controlling up and down movement of the equipment while riding in cage C, by means available to him on control panel P.

This type of equipment is exemplary of equipment where safety and reliability of operation render it important and even vital that there be no undue wear of the wire rope R as it passes through the segmented guide eye G of the present invention. Fraying of the wire rope R may result in jerking of the staging as the wire rope R passes through the guide eye, resulting in the risk of objects or persons falling from the staging. Should the wire rope R wear to the point of breaking, the dangers to people and property are too obvious to need to be stated.

Figure 2:
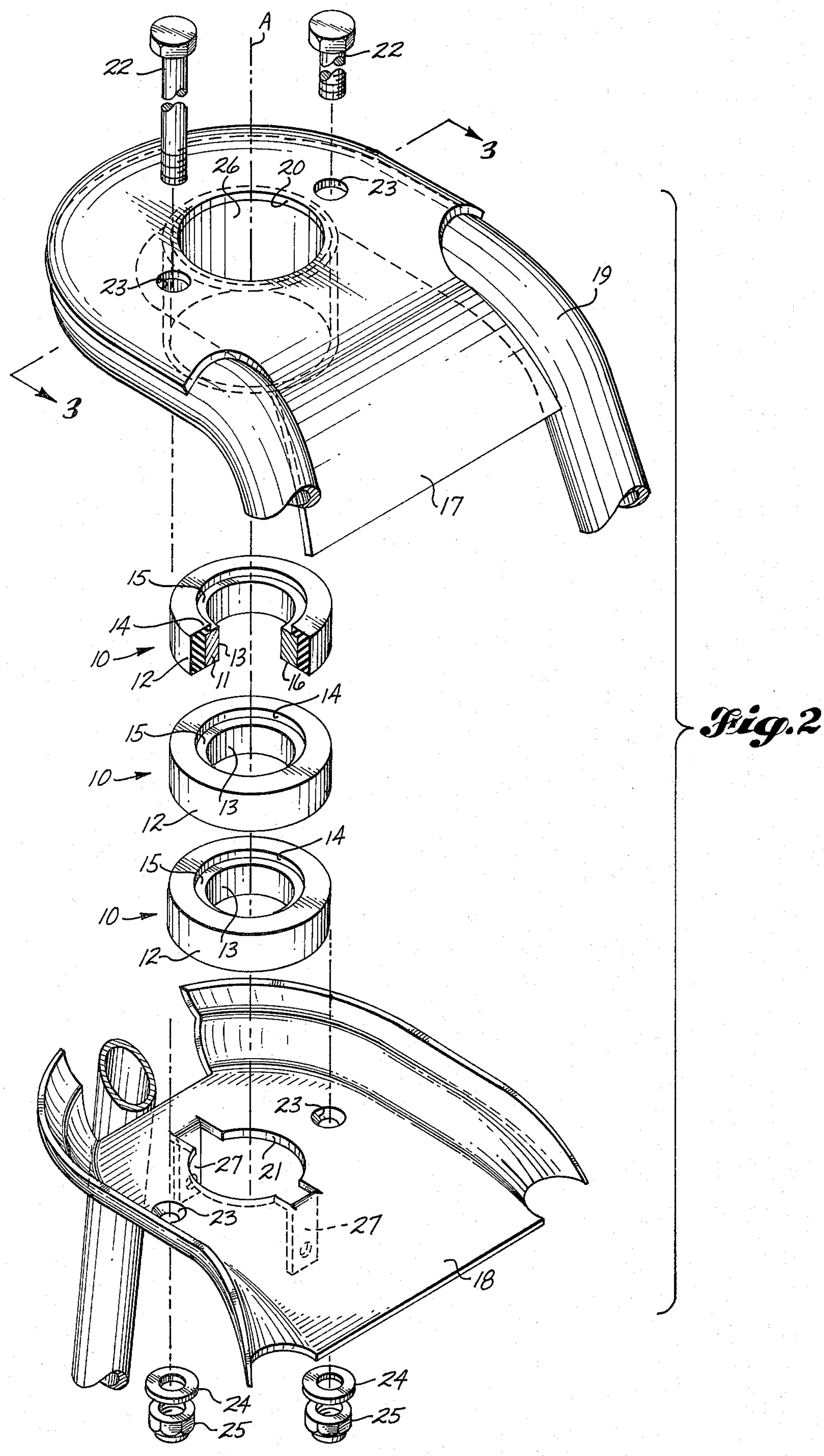
FIG. 2 is an exploded pictorial view of the segmented guide eye of the present invention and a loop of an associated frame with a portion of one ring member cut away.

The details of the construction of the present invention are best shown in FIG. 2. Each ring member 10 is identical and comprises an inner ring portion 11 surrounded by a concentric outer ring portion 12. However, it is possible for the size of each ring member 10 to be nonuniform.

Each inner ring 11 is composed of a hard, corrosion resistant metal capable of taking and keeping a high polish such as heat treated four-ten stainless steel or the like. Hardness provides maximum wear resistance and long life. Corrosion resistance is necessary to prevent deterioration of each inner ring 11 caused by the frequent exposure of the present invention to rain, salt water or other harmful elements. Maintaining a high polish on the inner surface 13 of each inner ring portion 11 is required to reduce the coefficient of friction between the wire rope R and each inner surface 13. A low coefficient of friction results in a low wear factor experienced by a wire rope R passing through the segmented guide eye G of the present invention.

Each outer ring portion 12 is composed of rubber or other suitable material which is both elastomeric and tough. Each outer ring portion 12 has the same axial length as its corresponding inner ring portion 11, but it is possible for the axial lengths of each outer ring portion 12 and its corresponding inner ring portion 11 to differ. In preferred form, each outer ring portion 12 is bonded to its corresponding inner ring portion 11, but it is to be understood that each outer ring portion 12 could be formed separately and sized to fit around its corresponding inner ring portion 11.

As shown in FIG. 2, each inner ring portion 11 has a cushioned radial face 15 with a shock cushion 14 overlying it. Frequently, when staging is used, a safety line or other object is attached to the wire rope above the guide eye. If the guide eye is run up against such an obstruction the shock cushions 14 serve to absorb at least part of the impact, thereby helping to protect the guide eye from damage. In preferred form, each shock cushion 14 is formed of the same material and as an integral part of its associated outer ring portion 12. Each shock cushion 14 is bonded to the radial face 15 of its associated inner ring portion 11. However, it is possible that each shock cushion 14 could be formed separately in the form of a washer or other suitable shape and placed between one or more adjacent inner ring portions 11 or between one or more inner ring portions 11 and its associated end member 16 or 17.

Although in some installations there may be as few as two ring members 10, it is preferred that there be at least three or more. An important feature of the present invention is that regardless of the number of ring members 10, a shock cushion 14 always exists axially between at least one pair of adjacent ring members 10 or between one of the members 17, 18 and their adjacent ring members 10, regardless of the way the rings are stacked. This results from the fact that in the preferred embodiment, each ring member 10 has a shock cushion 14 bonded to its cushioned radial face 15.

Top end member 17 and bottom end member 18 are both sheet metal stampings, and as shown by FIG. 2, are shaped to conform to and overly a portion of the exterior surface of tubular frame member 19. Members 17, 18 and 19 are made from steel, aluminum or other suitable metal.

Figure 3:
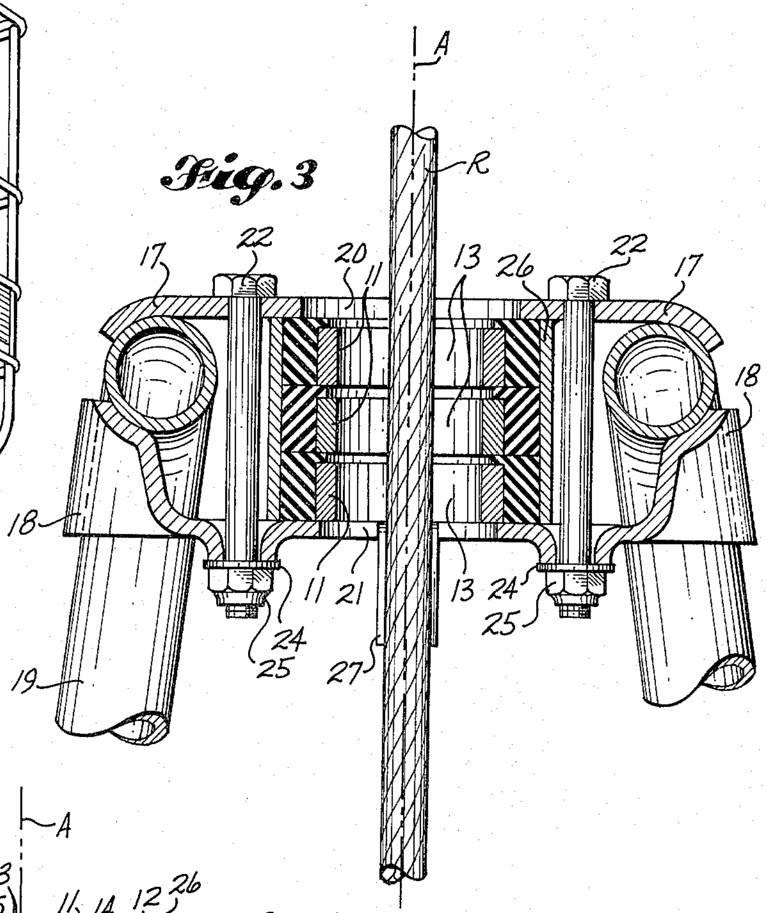
FIG. 3 is a cross-sectional view of the segmented guide eye illustrated in FIG. 2 taken substantially along line 3—3 thereof showing the cable extending along the axis A of the ring member.

As best shown in FIG. 3, top end member 17 has a wire rope aperature 20 whose diameter is sized between the inner and outer diameters of the elastomeric outer ring portion 12 of the adjacent ring member 10, or other suitable size, to prevent contact between the wire rope R and the top end member 17 when the wire rope is bent over at an angle away from axis A.

Bottom end member 18 has a wire rope aperature 21 whose diameter is sized between the inner and outer diameters of the adjacent inner ring portion 11. This prevents the inner ring portions 11 from being stripped free from their respective elastomeric outer ring portions 12 and from being pulled through the lower wire rope aperature 21 by the wire rope R or by an obstruction on the wire rope R.

A plurality of bolts 22, or other suitable fasteners pass through bolt aperatures 23 and are secured with washers 24 and nuts 25. The bolts 22, washers 24 and nuts 25 hold the various elements of the segmented guide eye of the present invention in assembled relation with the tubular frame member sandwiched between the top and bottom end members 17, 18 as shown in FIG. 3.

The ring members 10 are held in an axially aligned stacked relation by cylindrical housing 26. The shock cushions 14 and the elastomeric outer ring portions 12 of the ring members 10 are slightly undersized with respect to the cylindrical housing 26, and when the ring members 10 and shock cushions 14 are stacked, they have a combined height slightly greater than the height of the housing 26. Then, when the top and bottom end members 17, 18 are drawn together by bolts 23, the shock cushions 14 and elastomeric outer ring portions 12 are compressed into the housing 26 causing them to swell outwardly into tight contact with the cylindrical housing 26. The tight fit holds them relatively in place while still permitting them to distort to permit a bending line of contact between the hard metal inner ring portions 11 and the wire rope R.

A pair of ears 27, support a tensioning unit for the wire rope which forms no part of the present invention.

Figure 4:
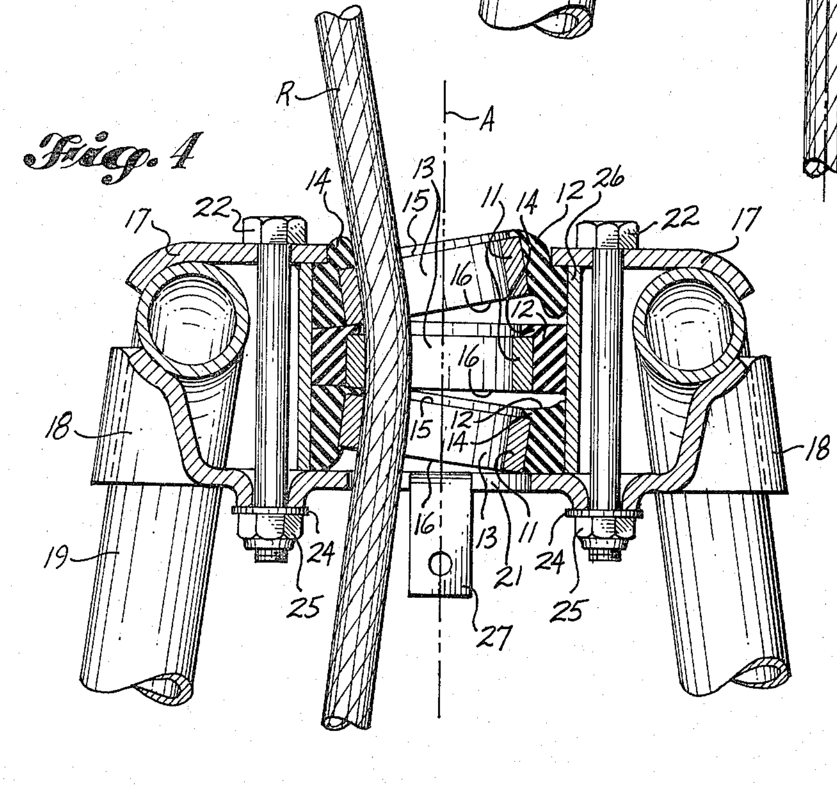
FIG. 4 is a view like FIG. 3, except the cable has deviated from the axis A and is bearing against the hard metal inner ring portions of the ring members.

In use, when wire rope R passes through the segmented guide eye G of the present invention, it frequently happens that the wire rope R deviates from the axis A of the guide eye G, thereby coming into contact with the inner surfaces 13 of the ring members 10 as shown in FIG. 4. Referring to FIG. 1, such deviations may result from the back and forth motions of the wire rope R as it is wound on winch W, and may also be caused by the attachment point of the wire rope R on the top of a building (not illustrated) not being directly above the segmented guide eye G. When there is a long segment of staging with a guide eye G, a wire rope R and a winch W at each end (not illustrated), such deviations of the wire rope R from the axis A may also be caused by the attachment points of the wire ropes R on the building or other structure being placed closer together or farther apart than are the guide eyes G.

During such deviations, a major wear factor in the guide eye is the force exerted by the wire rope R normal to the surface it comes into contact with. A relatively large area of contact distributes the force normal so that it is not concentrated, thereby reducing wear on the wire rope R and the guide eye G. The present invention achieves a relatively large area of contact, as shown in FIG. 4, by applicant's use of elastomeric outer portions 11 which distort to permit a bending line of contact between a tensioned wire rope R and the hard metal inner ring portions 11. This bending line of contact permits, of course, a constant, relatively large area of contact between the wire rope R and the guide eye G, regardless of the amount of deviation, resulting in reduced wear characteristics.

From the foregoing, various further applications, modifications and adaptions of the apparatus disclosed by the foregoing preferred embodiment of the present invention will be apparent to those skilled in the art to which the present invention is addressed, within the scope of the following claims.

What is claimed is:

1. For use in an installation wherein a tensioned wire rope or the like may bend as it passes through a guide eye and in so doing will bear heavily against a side of the guide eye, an improved guide eye comprising:

a plurality of ring members, each having an axial length that is substantially smaller than its diameter, and each comprising a hard metal inner ring portion of stainless steel or the like and a concentric outer ring portion of elastomeric material; and support means engaging said elastomeric material and holding said ring members in a stacked relationship with the open centers of the hard metal inner ring portions normally aligned, said support means permitting the elastomeric outer ring portions to distort when a tensioned wire rope or the like passing through the hole bears sideways against the hard metal inner ring portions, an amount sufficient to allow said hard metal inner ring portions to move angularly and make a generally rounded bent line contact with a tensioned wire rope or the like passing through the guide eye.

2. An improved guide eye according to claim 1, wherein said support means comprises first and second end members, each having a hole coaxial with the open centers of said ring members, wherein both holes are smaller in diameter than the outer diameter of said ring members, and with at least one of said holes being larger in diameter than the hard metal inner ring portions so that the hard metal inner ring portion of the ring member closest to such hole can move partially out through such hole when the elastomeric material distorts, to allow the hard metal inner ring portions to make a rounded bending line contact with the tensioned wire rope or the like passing through the guide eye.

3. An improved guide eye according to claim 2, wherein said support means comprises a tubular member retained between said first and second end members in a snug surrounding relationship to the elastomeric outer ring portions of the ring members.

4. An improved guide eye according to claim 1, including elastomeric material bounding at least a substantial portion of one transverse end face of the hard metal inner ring portion of at least one ring member, to serve as a shock cushion to absorb at least part of any impact in the axial direction which the guide eye may encounter during use.

5. A segmented guide eye for a tensioned wire rope or the like, comprising:

a plurality of ring members, each comprising a hard metal inner ring portion and a concentric outer ring portion of elastomeric material;

support means holding said ring members in a stacked relationship with the open centers of the hard metal inner ring portions aligned whereby when a tensioned wire rope or the like passing through said open centers bears against the hard metal inner ring portions, the elastomeric outer ring portions will distort and said hard metal inner ring portions will make a generally rounded bent line contact with said tensioned wire rope or the like, said support means comprising first and second end members, each having a hole coaxial with the open centers of said ring members through which the tensioned wire rope or the like passes, and a tubular member retained between said first and second end members in a snug surrounding relation to said ring members, and a loop portion of a frame member, and fastener means for connecting said first and second end members to said loop portion with said tubular member sandwiched between said end members and said tubular member within the loop portion.

6. A segmented guide eye for a tensioned wire rope or the like, comprising:

a plurality of ring members, each comprising a hard metal inner ring portion and a concentric outer ring portion of elastomeric material; and support means holding said ring members in a stacked relationship with the open centers of the hard metal inner ring portions aligned, whereby when a tensioned wire rope or the like passes through said open centers bears against the hard metal inner ring portions, the elastomeric outer ring portions will distort and said hard metal inner ring portions will make generally rounded bent line contact with said tensioned wire rope or the like, said support means comprising first and second end members, each having a hole coaxial with the open centers of said ring members through which the tensioned wire rope or the like passes, and a tubular member retained between said first and second end members in snug surrounding relationship to said ring members, wherein said hole in the first end member has a diameter sized between the inner and outer diameter of the hard metal inner ring portion of the adjacent ring member.

7. A segmented guide eye for a tensioned wire rope or the like, comprising:

a plurality of ring members, each comprising a hard metal inner ring portion and a concentric outer ring portion of elastomeric material; and support means holding said ring members in a stacked relationship with the open centers of the hard metal inner ring portions aligned, whereby when a tensioned wire rope or the like passes through said open centers bears against the hard metal inner ring portions, the elastomeric outer ring portions will make generally rounded bent line contact with said tensioned wire rope or the like, said support means comprising first and second end members, each having a hole coaxial with the open centers of said ring members through which the tensioned wire rope or the like passes, and a tubular member retained between said first and second end members in snug surrounding relationship to said ring members, wherein said hole at the second end member has a diameter sized between the inner and outer diameters of the elastomeric outer ring portion of the adjacent ring member.

8. A segmented guide eye according to claim 7, wherein said hole in the first end member has a diameter sized between the inner and outer diameter of the hard metal inner ring portion of the adjacent ring member.

* * * * *